Patented May 3, 1949

2,469,335

UNITED STATES PATENT OFFICE 2,469,335

CATALYTIC ALKYLATION

George C. Johnson, Woodbury, and Barton W. Rope, Mullica Hill, N. J., assignors to Socony-Vacuum Oil Company, Incorporated, a corporation of New York No Drawing. Application March 29, 1946, Serial No. 658,226

13 Claims. (Cl. 260—671)

This invention relates to the alkylation of saturated hydrocarbons, and is more particularly concerned with the catalytic alkylation of saturated hydrocarbons in the presence of novel alkylation catalysts.

It is well known in the art to react various types of saturated hydrocarbons with various substances, to effect the union of molecules of the various types of saturated hydrocarbons with alkyl radicals produced by the various substances under the conditions of reaction. Processes embodying this reaction are called alkylation processes and the substances which supply the alkyl radicals are called alkylating agents. Accordingly, in alkylation processes, a charge comprising a mixture of an alkylatable saturated hydrocarbon, called the alkylatable saturated hydrocarbon reactant, and an alkylating agent is subjected to high temperatures and pressures to produce a product called the alkylate. In general, since conditions of alkylation also cause side reactions involving primarily the alkylating agent, it is necessary to maintain a relatively low concentration of the alkylating agent in the charge. The only limit to the pressure used appears to be the feasibility of maintaining high pressures. On the other hand, the temperature used is limited by the degradation of the hydrocarbon reactants in the charge to low molecular weight hydrocarbons and the occurrence of side reactions, including, for example, polymerization of olefinic hydrocarbons, where they are utilized as alkylating agents, under high temperature conditions, which substantially reduce the purity of the product obtained. The temperature of reaction, the time of reaction, the pressure employed and the control of the concentration of the alkylating agent in the reaction zone alluded to are collectively referred to in the art as alkylating conditions.

The temperatures and to a certain extent, the pressures employed in alkylation operations depend upon whether the alkylation is effected in the absence or presence of alkylation catalysts. The two methods are generally referred to as thermal and catalytic alkylation, respectively. As is well known to those familiar with the art, thermal alkylation ordinarily involves the use of temperatures of about 750–1000° F. and pressures of the order of 4000 pounds per square inch or higher. Under these relatively severe conditions, the degradation of the hydrocarbon reactants in the charge, and the occurrence of side reactions involving the alkylating agents are somewhat marked. On the other hand, catalytic alkylation involves the use of appreciably less severe conditions, thereby assuring a high yield of desired alkylate by avoiding extensive degradation of the reactants and the marked occurrence of secondary reactions.

Several processes are known for carrying out catalytic alkylations. Apart from technological differences, these processes differ from one another primarily in the type of alkylation catalyst employed. For example, sulfuric acid, hydrofluoric acid, and various metal halides, especially aluminum chloride, have been used as alkylation catalysts. More recently, the use of complexes of boron trifluoride has also been proposed. For instance, it has been suggested to use complexes formed from boron trifluoride and phosphoric acid, from a boron halide and sulfuric acid, and from boron trifluoride and water.

Fluophosphoric acids are well known compounds. In accordance with a process disclosed in a copending application, Serial Number 540,316, filed June 14, 1944, now United States Patent No. 2,409,248, fluophosphoric acids constitute excellent polymerization catalysts. However, as illustrated hereinafter, all our attempts to use monofluophosphoric acid, for example, as an alkylation catalyst have conclusively shown substantially no alkylation catalytic activity on the part of this acid, although confirming its marked tendency to promote polymerization reactions.

We have now found that the product obtained by reacting a fluophosphoric acid, i. e., monofluophosphoric acid or difluophosphoric acid, with boron trifluoride is an efficient alkylation catalyst.

We have discovered new alkylation catalysts which promote alkylation reactions under relatively mild reaction conditions, thereby obviating the undesirable degradation of the hydrocarbon reactants in the charge and substantially completely avoiding the objectionable side reactions, both referred to hereinbefore.

It must be noted that although boron halides, such as boron trifluoride, have been proposed as alkylation catalysts, under the relatively mild reaction conditions used herein, and as illustrated hereinafter, boron trifluoride, for example, does not promote alkylation reactions.

Accordingly, it is an object of the present invention to provide an efficient process for alkylating alkylatable hydrocarbons. Another object is to provide an efficient catalytic process for alkylating alkylatable hydrocarbons. A more specific object is to provide new alkylation catalysts. A very important object is to afford a process for alkylating alkylatable hydrocarbons in the presence of the product obtained by reacting a fluophosphoric acid with boron trifluoride. Other objects and advantages of the present invention will become apparent to those skilled in the art from the following description.

Broadly stated, our invention provides a catalytic process for alkylating alkylatable hydrocarbons, which comprises contacting an alkylatable hydrocarbon with an alkylating agent in the presence of the product obtained by reacting a fluophosphoric acid with boron trifluoride, under alkylating conditions.

The alkylatable saturated hydrocarbons utilized in the process of the present invention comprise isoparaffinic, alkyl alicyclic and aromatic hydrocarbons.

In general, any isoparaffinic hydrocarbon may be used in our process. In the production of valuable constituents of motor fuels, isobutane is the isoparaffinic hydrocarbon most commonly subjected to alkylation with monoolefinic hydrocarbons to produce more highly-branched paraffinic hydrocarbons. The higher branched-chain paraffinic hydrocarbons, such as isopentane, being themselves desirable constituents of motor fuels, are less often subjected to alkylation. Nevertheless, in accordance with the process of our invention, these branched-chain paraffinic hydrocarbons may be alkylated, if desired.

Non-limiting examples of the alkylatable alkyl alicyclic hydrocarbons which may be utilized in our process are methyl cyclopentane and dimethyl cyclohexane.

Benzene, toluene, xylenes, and other polyalkyl benzenes, naphthalene, alkyl and polyalkyl naphthalenes, and other polynuclear aromatic hydrocarbons which can be alkylated ordinarily may be used as the alkylatable hydrocarbon reactant in the process of our invention. These aromatic hydrocarbons may be subjected to treatment in accordance with our process to produce more highly-branched aromatic hydrocarbons as well as monoalkyl and polyalkyl aromatic hydrocarbons.

In general, any olefinic hydrocarbon can be used as an alkylating agent in the process of our invention. These olefinic hydrocarbons may be monoolefinic hydrocarbons; cyclic olefinic hydrocarbons, such as cyclohexene; or diolefinic hydrocarbons, such as butadiene. The monoolefinic hydrocarbons used may be either normally gaseous or normally liquid, and include ethene, propene, butenes, pentenes, and higher normally liquid olefinic hydrocarbons, such as octenes or decenes. Alkynes, such as methyl acetylene, and terpenes may be utilized also as alkylating agents, if desired.

In view of the state of the art, it must be clearly understood that a monoolefinic hydrocarbon may be produced in situ under the conditions of operation from a wide variety of compounds. Such olefin-producing compounds have been used extensively as alkylating agents in alkylation operations, and comprise, for example, alcohols, esters, ethers, and alkyl halides. Accordingly, any alcohol, ester, ether or alkyl halide or compound which is capable of producing the corresponding monoolefine hydrocarbon by dehydration or splitting under the conditions of our process must be considered to be included herein as a suitable alkylating agent. Obviously, for reasons of economy, particularly when operating on a commercial scale, we prefer to use monoolefinic hydrocarbons as the alkylating agents.

The alkylatable saturated hydrocarbon reactants and the alkylating agents to be used in the process of the present invention may be obtained or derived from any suitable source, as is well known in the art, and may be used either in the pure state or in admixture with other constituents not undesirable. For example, in the preparation of valuable constituents of motor fuels, a conventional and preferred source of paraffinic and olefinic hydrocarbons suitable as feed stocks for the process of the present invention, is the mixture of butenes and butanes obtained from either thermal or catalytic cracking operations; in the preparation of useful solvents, of valuable constituents of motor fuels or of intermediates utilizable in organic syntheses, aromatic hydrocarbons may be obtained from petroleum, by the catalytic or thermal cracking of higher aromatic hydrocarbons, by the distillation of coal, by the dehydrogenation of suitable alicyclic hydrocarbons, by the dehydrogenation and cyclization of aliphatic hydrocarbons, etc., all as is well known to those familiar with the art.

There appears to be nothing critical in the proportions of reactants used in the charge. However, it is desirable, as in known alkylation processes, to keep the concentration of the alkylating agent relatively low during the alkylation reaction, in order to avoid the side reactions involving the alkylating agent as much as possible. Accordingly, it is advisable, for example, to maintain the monoolefinic hydrocarbon concentration in the charge below 50%, and preferably, below 25% by volume. In continuous operation, this is effected by introducing the alkylating agent at a number of points in the reaction zone or by adding the alkylating agent to a recirculating excess of alkylatable hydrocarbon reactant.

The novel catalyst which we use is the product obtained by reacting boron trifluoride with a fluophosphoric acid. For the purpose of the present invention, we contemplate using either monofluophosphoric acid ($H_2PO_3F$) or difluophosphoric acid ($HPO_2F_2$), although we prefer to use the monofluophosphoric acid. This is ordinarily achieved by saturating the acid with the boron trifluoride. Without any intent of limiting the scope of the present invention, we believe that our catalyst is a compound formed by the reaction between one molecule of monofluophosphoric acid or difluophosphoric acid and one molecule of boron trifluoride. Our belief is based in part on the following which illustrates a method of preparing our catalyst:

50 grams (0.50 mole) of monofluophosphoric acid were placed in a stainless steel autoclave of 900 ml. capacity which was fitted with a stirrer and immersed in a water bath. The acid was kept at a temperature of 20° C. and was saturated with boron trifluoride by maintaining the monofluophosphoric acid in an atmosphere of boron trifluoride gas until no further boron trifluoride was absorbed, as indicated by a steady reading on a pressure gage attached to the autoclave. 88 grams of the catalyst were obtained indicating that 38 grams of boron trifluoride (0.56 mole) had entered the product. This represents approximately a 1:1 compound. A little more boron trifluoride than that corresponding to a 1:1 ratio entered the product.

Other boron halides may be used in the preparation of our catalyst. For example, boron trichloride may be used instead of boron trifluoride.

The amount of catalyst to be used may vary within wide limits, and, of course, depends upon the amounts of the reactants employed. Ordinarily, in batch operations, we use the catalyst in amounts varying between about 8% and about 20%, based on the weight of the charge, and in continuous operation, ordinarily not less than 100 parts of the charge is reacted in the presence of one part of catalyst.

In carrying out our process, we ordinarily use temperatures varying between about $-10°$ C. and about $80°$ C., preferably, temperatures varying between about $0°$ C. and about $50°$ C. It will be seen that an important feature of the process of the present invention is the relatively low reaction temperature employed. As a result, degradation of the hydrocarbon reactants in the charge to low molecular weight hydrocarbons and the pronounced occurrence of side reactions are substantially completely avoided. Consequently, in our process, we obtain high yields of a high-grade product which is almost entirely saturated in nature and is substantially free from impurities.

Pressure is not an important factor. Accordingly, atmospheric, subatmospheric or superatmospheric pressure may be employed. Consequently, the reaction embodied in the process of the present invention may be effected in the liquid phase, vapor phase or mixed phase. We prefer to operate in the liquid phase when using butenes as the alkylating agents, and hence, use enough pressure on the reactor to keep the butenes liquid.

The process may be carried out as a batch, continuous or semicontinuous type of operation. Particularly when the process is carried out on a commercial scale, economic considerations make it preferable to operate in a continuous manner. For efficient operation, whether the process is carried out on a batch or continuous basis, it is essential that the hydrocarbon reactants be intimately contacted with the catalyst of our invention for the length of time necessary to achieve the alkylation, ordinarily, from 0.1 to 20 minutes. This may be effected in several ways and in apparatus which are well known in the art.

The following detailed examples are for the purpose of illustrating the process of our invention and the advantages thereof, it being clearly understood that the invention is not to be considered as limited to the specific reactants or to the manipulations and conditions set forth therein. As it will be apparent to those skilled in the art, a wide variety of other reactants may be used.

Example 1

Fifty grams of monofluophosphoric acid saturated with boron trifluoride were placed in a stainless steel autoclave of 900 ml. capacity, which was fitted with a stirrer and immersed in a water bath kept at a temperature of $20°$ C. Subsequently, 300 c. c. of isobutane were pumped into the autoclave and then 300 c. c. of isobutene were added at a rate of 10 c. c. per minute. After the addition of the isobutene, stirring was continued for 60 minutes. The catalyst was then withdrawn and the product was stabilized by subjecting the same to a distillation in a glass fractionating column until the vapor temperature had reached $25°$ C. 140 grams of stabilized product were obtained. This product was washed twice with water, once with a dilute aqueous solution of sodium hydroxide, and again, once with water. 122 grams of washed product were obtained. The washed product was subjected to a distillation to produce three fractions and a residuum. The first fraction boiled below $170°$ C.; the second, $170-185°$ C.; the third, $185-200°$ C.; and the residuum above $200°$ C. The distillate fractions were combined and together represented 64.7% by weight of the product. This alkylate had a bromine number of 3.4 and a specific gravity of 0.719, indicating a relatively high degree of alkylation. The residue had a bromine number of 51.0 and a specific gravity of 0.811.

Example 2

The run set forth in Example 1 was repeated with the exception that 400 c. c. of isobutane were reacted with 200 c. c. of isobutene. The washed product weighed 106 grams. This product was subjected to distillation with the following results:

| Fraction | Per Cent by Weight of Product | Bromine Number |
|---|---|---|
| 25–170° C | 71.5 | 0.0 |
| 170–185° C | 14.4 | |
| 185–200° C | 3.7 | |
| Residue | 10.4 | 43.8 |

Example 3

The run set forth in Example 1 was repeated with the exception that 400 c. c. of isobutane were reacted with 200 c. c. of propylene. The washed product weighed 74 grams. This product was subjected to distillation with the following results:

| Fraction | Per Cent by Weight of Product | Bromine Number |
|---|---|---|
| 25–170° C | 60.4 | 0.0 |
| 170–185° C | 5.3 | |
| 185–200° C | 2.5 | |
| Residue | 31.8 | |

Example 4

In order to prepare alkylate in amounts sufficient for a motor test, 200 grams of monofluophosphoric acid were saturated with boron trifluoride and placed in a 6-liter autoclave equipped with a stirrer and surrounded with a water jacket kept at a temperature of $20°$ C. 3000 c. c. of isobutane were pumped into the autoclave and 1500 c. c. of isobutene were added at a rate of 80 c. c. per minute. After the addition of the isobutene, stirring was continued for 60 minutes. The catalyst was then withdrawn and the product was stabilized and washed as in Example 1. The washed product which weighed 1159 grams was then subjected to distillation with the following results:

| Fraction | Per Cent by Weight of Product | Bromine Number |
|---|---|---|
| 25–170° C | 61.0 | 0.0 |
| 170–185° C | 7.5 | 0.0 |
| 185–200° C | 6.9 | 5.3 |
| Residue | 24.6 | 39.5 |

The first two fractions were combined and a quart sample was leaded with 4.0 ml./gal. of lead tetraethyl and tested in accordance with the A. S. T. M. knock test for aviation fuels (D614–44T) and found to have a rating of iso $+0.45$, a representative figure for alkylate.

Example 5

The run set forth in Example 1 was repeated with the exception that 400 c. c. of isobutane were reacted with 200 c. c. of isobutene, and 50 grams of monofluophosphoric acid were used instead of the monofluophosphoric acid saturated with boron trifluoride. The washed product weighed 107 grams. This product was subjected to distillation with the following results:

| Fraction | Per Cent by Weight of Product | Bromine Number |
|---|---|---|
| 25–170° C | 10.2 | 110.8 |
| 170–185° C | 39.2 | 96.7 |
| 185–200° C | 2.6 | |
| Residue | 48.0 | 74.0 |

The low yield of product boiling in the range 25–170° C. and the high bromine numbers of the fractions boiling in the ranges 25–170° C. and 170–185° C. demonstrate than monofluophosphoric acid alone acts as a polymerization catalyst rather than as an alkylation catalyst.

Example 6

The run set forth in Example 1 was repeated with the exception that 400 c. c. of isobutane were reacted with 200 c. c. of isobutene and that the isobutane was saturated with boron trifluoride prior to the addition of the isobutene. No monofluophosphoric acid saturated with boron trifluoride was employed. The washed product weighed 102 grams. This product was subjected to distillation with the following results:

| Fraction | Per Cent by Weight of Product | Bromine Number |
|---|---|---|
| 25–170° C | 17.1 | 142.1 |
| 170–185° C | 45.1 | 102.7 |
| 185–200° C | 0.9 | |
| Residue | 36.9 | 57.8 |

The low yield of product boiling in the range 25–170° C. and the high bromine numbers of the fractions boiling in the ranges 25–170° C. and 170–185° C. show that boron trifluoride alone is a polymerization catalyst and not an alkylation catalyst.

For the purpose of facilitating comparison of the results obtained in comparable runs, the former are set forth in the following table:

| Example No. | Catalyst | Per Cent by Weight of Product in Each Fraction | | | | Bromine Number of Each Fraction | | | |
|---|---|---|---|---|---|---|---|---|---|
| | | I 25–170° C. | II 175–175° C. | III 185–200° C. | IV Residue | I | II | III | IV |
| 2 | H₂FPO₃+BF₃ | 71.5 | 14.4 | 3.7 | 10.4 | 0.0 | | | 43.8 |
| 5 | H₂FPO₃ | 10.2 | 39.2 | 2.6 | 48.0 | 110.8 | 96.7 | | 74.0 |
| 6 | BF₃ | 17.1 | 45.1 | 0.9 | 36.9 | 142.1 | 102.7 | | 57.8 |

It is quite evident from these data that monofluophosphoric acid when used alone and boron trifluoride when used alone possess negligible tendencies to promote alkylation reactions. However, it is quite apparent from these data that the complex obtained from monofluophosphoric acid and boron trifluoride is an efficient and highly desirable alkylation catalyst.

It will be apparent that the present invention provides an efficient process for alkylating saturated hydrocarbons. Our process is of considerable value in making available alkyl saturated hydrocarbons which are useful, for example, as intermediates in organic synthesis, as solvents, and as constituents of motor fuels.

Although the present invention has been described in conjunction with preferred embodiments, it is to be understood that modifications and variations may be resorted to without departing from the spirit and scope thereof, as those skilled in the art will readily understand. Such variations and modifications are considered to be within the purview and scope of the appended claims.

We claim:

1. In the process for alkylating alkylatable hydrocarbons, which includes contacting an alkylatable hydrocarbon with an alkylating agent, under alkylating conditions; the improvement which comprises contacting said alkylatable hydrocarbon with an alkylating agent, in the presence of the product obtained by reacting a fluophosphoric acid selected from the group consisting of monofluophosphoric acid and difluophosphoric acid, with boron trifluoride, as the catalyst.

2. The process for alkylating alkylatable hydrocarbons, which comprises contacting an alkylatable hydrocarbon with an alkylating agent, in the presence of the product obtained by reacting monofluophosphoric acid with boron trifluoride as the catalyst, under alkylating conditions including temperatures varying between about minus 10° C. and about 80° C.

3. The process for alkylating alkylatable hydrocarbons, which comprises contacting an alkylatable hydrocarbon with an alkylating agent, in the presence of monofluophosphoric acid saturated with boron trifluoride as the catalyst, under alkylating conditions including temperatures varying between about 0° C. and about 50° C.

4. The process for alkylating alkylatable isoparaffinic hydrocarbons, which comprises contacting an alkylatable isoparaffinic hydrocarbon with a monoolefinic hydrocarbon, in the presence of the product obtained by reacting a fluophosphoric acid selected from the group consisting of monofluophosphoric acid and difluophosphoric acid, with boron trifluoride, as the catalyst, under alkylating conditions.

5. In the process for alkylating alkylatable isoparaffinic hydrocarbons, which includes contacting an alkylatable isoparaffinic hydrocarbon with a monoolefinic hydrocarbon, under alkylating conditions; the improvement which comprises contacting said alkylatable isoparaffinic hydrocarbon with a monoolefinic hydrocarbon, in the presence of the product obtained by reacting monofluophosphoric acid with boron trifluoride as the catalyst, at temperatures varying between about minus 10° C. and about 30° C.

6. The process for alkylating alkylatable isoparaffinic hydrocarbons, which comprises contacting an alkylatable isoparaffinic hydrocarbon with a monoolefinic hydrocarbon, in the presence of monofluophosphoric acid saturated with boron trifluoride as the catalyst, under alkylating conditions including temperatures varying between about 0° C. and about 50° C.

7. The process for alkylating isobutane, which comprises contacting isobutane with a butene, in the presence of monofluophosphoric acid saturated with boron trifluoride as the catalyst, under alkylating conditions, including temperatures varying between about 0° C. and about 50° C.

8. The process for alkylating alkylatable aromatic hydrocarbons, which comprises contacting an alkylatable aromatic hydrocarbon with a monoolefinic hydrocarbon, in the presence of the product obtained by reacting a fluophosphoric acid selected from the group consisting of monofluophosphoric acid and difluophosphoric acid, with boron trifluoride, as the catalyst, under alkylating conditions.

9. The process for alkylating alkylatable aromatic hydrocarbons, which comprises contacting an alkylatable aromatic hydrocarbon with a monoolefinic hydrocarbon, in the presence of the product obtained by reacting monofluophosphoric acid with boron trifluoride as the catalyst, under alkylating conditions including temperatures varying between about minus 10° C. and about 80° C.

10. In the process for alkylating alkylatable aromatic hydrocarbons, which includes contacting an alkylatable aromatic hydrocarbon with a monoolefinic hydrocarbon, under alkylating conditions; the improvement which comprises contacting said alkylatable aromatic hydrocarbon with a monoolefinic hydrocarbon, in the presence of monofluophosphoric acid saturated with boron trifluoride as the catalyst, at temperatures varying between about 0° C. and about 50° C.

11. In the process for alkylating alkylatable alicyclic hydrocarbons, which includes contacting an alkylatable alicyclic hydrocarbon with a monoolefinic hydrocarbon, under alkylating conditions; the improvement which comprises contacting said alkylatable alicyclic hydrocarbon with a monoolefinic hydrocarbon, in the presence of the product obtained by reacting a fluophosphoric acid selected from the group consisting of monofluophosphoric acid and difluophosphoric acid, with boron trifluoride, as the catalyst.

12. The process for alkylating alkylatable alicyclic hydrocarbons, which comprises contacting an alkylatable alicyclic hydrocarbon with a monoolefinic hydrocarbon, in the presence of the product obtained by reacting monofluophosphoric acid with boron trifluoride as the catalyst, under alkylating conditions including temperatures varying between about minus 10° C. and about 80° C.

13. The process for alkylating alkylatable alicyclic hydrocarbons, which comprises contacting an alkylatable alicyclic hydrocarbon with a monoolefinic hydrocarbon, in the presence of monofluophosphoric acid saturated with boron trifluoride as the catalyst, under alkylating conditions including temperatures varying between about 0° C. and about 50° C.

GEORGE C. JOHNSON.
BARTON W. ROPE.

REFERENCES CITED

The following references are of record in the file of this patent:

UNITED STATES PATENTS

| Number | Name | Date |
|---|---|---|
| 1,671,517 | Edeleanu | May 29, 1928 |
| 2,317,694 | Ott | Apr. 27, 1943 |
| 2,363,222 | Beyerstedt | Nov. 21, 1944 |
| 2,366,731 | Ipatieff et al. | Jan. 9, 1945 |
| 2,401,884 | Schulze et al. | June 11, 1946 |